United States Patent
Hayashi et al.

(10) Patent No.: US 6,908,076 B2
(45) Date of Patent: Jun. 21, 2005

(54) UPPER MOUNT OF VEHICLE SUSPENSION, INCLUDING ELASTIC BODY FIXED IN METAL HOUSING AND HAVING SEALING LIP IN CONTACT WITH INNER SURFACE OF THE HOUSING

(75) Inventors: Yukio Hayashi, Kasugai (JP); Koichi Kobayashi, Kasugai (JP); Michiharu Hikosaka, Komaki (JP); Yorikazu Nakamura, Kasugai (JP)

(73) Assignee: Tokai Rubber Industries, Ltd. (JP)

( * ) Notice: Subject to any disclaimer, the term of this patent is extended or adjusted under 35 U.S.C. 154(b) by 256 days.

(21) Appl. No.: 10/389,805

(22) Filed: Mar. 18, 2003

(65) Prior Publication Data

US 2003/0178269 A1 Sep. 25, 2003

(30) Foreign Application Priority Data

Mar. 22, 2002 (JP) ...................................... 2002-081949

(51) Int. Cl.$^7$ ............................. B60G 13/00; F16F 1/36
(52) U.S. Cl. ...................... 267/220; 267/153; 267/292; 280/124.147; 280/124.155
(58) Field of Search ................. 280/124.147, 124.155; 267/292, 220, 153

(56) References Cited

U.S. PATENT DOCUMENTS

| 4,465,296 A | * | 8/1984 | Shiratori et al. | ...... 280/124.155 |
| 4,477,061 A | * | 10/1984 | Kawaura et al. | ............ 267/220 |
| 4,486,028 A | * | 12/1984 | Tanahashi | ............ 280/124.155 |
| 4,798,370 A | * | 1/1989 | Inuzuka | ...................... 267/220 |
| 4,981,287 A | * | 1/1991 | Cothenet | .................... 267/292 |
| 5,078,370 A | * | 1/1992 | McClellan | .................. 267/220 |
| 5,308,048 A | * | 5/1994 | Weaver et al. | .............. 267/220 |
| 5,342,029 A | * | 8/1994 | Carter | ........................ 267/220 |
| 6,155,543 A | * | 12/2000 | Solomond et al. | .......... 267/216 |
| 6,290,218 B1 | * | 9/2001 | Mayerbock | ................. 267/220 |
| 6,588,780 B2 | * | 7/2003 | Hayashi et al. | ....... 280/124.147 |
| 6,592,112 B2 | * | 7/2003 | Bishop et al. | .............. 267/220 |
| 6,666,439 B2 | * | 12/2003 | Romer | ........................ 267/220 |

FOREIGN PATENT DOCUMENTS

| JP | 58-77945 | 5/1983 |
| JP | 2521763 | 10/1996 |
| JP | 9-303475 | 11/1997 |

* cited by examiner

*Primary Examiner*—Benjamin A. Pezzlo
(74) *Attorney, Agent, or Firm*—Parkhurst & Wendel, L.L.P.

(57) ABSTRACT

An upper mount in a suspension system of an automotive vehicle, including a metal housing, a cylindrical body accommodated in the housing, and an outer metal sleeve bonded to the outer circumferential surface of the elastic body and fitted in the housing, wherein the elastic body has an annular sealing lip integrally formed of a rubber material and located radially outwardly of a central opening formed through an upper wall portion of the housing such that the sealing lip is held in pressing contact with an inner surface of the upward wall portion or a cylindrical wall portion of the housing, for preventing a flow of an aqueous component such as water from the central opening to the outer metal sleeve.

6 Claims, 6 Drawing Sheets

UPPER MOUNT OF VEHICLE SUSPENSION, INCLUDING ELASTIC BODY FIXED IN METAL HOUSING AND HAVING SEALING LIP IN CONTACT WITH INNER SURFACE OF THE HOUSING

This application is based on Japanese Patent Application No. 2002-081949 filed on Mar. 22, 2002, the contents of which are incorporated hereinto by reference.

BACKGROUND OF THE INVENTION

1. Field of the Invention

The present invention relates to an upper mount in a suspension system of an automotive vehicle, and more particularly to a fluid-tight sealing arrangement in the upper mount.

2. Discussion of Related Art

JP-A-58-77945 discloses an example of a suspension upper mount of the type described above, in the form of a strut mount as shown in FIGS. 5A and 5B.

The upper mount shown in FIGS. 5A and 5B is used in a strut type suspension system arranged to connect a wheel (tire) 200 of an automotive vehicle to the body of the vehicle in a vibration-damping fashion. The wheel 200 is rotatable about an axis of an axle 202 attached to a spindle. The vehicle body includes a panel 206 to which the spindle 204 is connected through a lower arm 208 and suspension bushings 210.

The strut type suspension system includes a shock absorber 212 and a coil spring 214, as major components thereof. The shock absorber 212 has a cylinder 216, and a piston rod 218 which extends upwards from a piston slidably fitted within the cylinder 216, such that an upper end portion of the piston rod 218 is located outside the housing of the cylinder 216. The shock absorber 212 is connected at its lower end portion to the spindle 204.

The strut type suspension system further includes as a major component an upper mount 220 in the form of a strut mount disposed between an assembly of the shock absorber 212 and the coil spring 214 and the vehicle body panel 206, for elastically connecting the above-indicated assembly 212, 214 to the panel 206. The upper mount 220 includes as a major component an elastic body 227, as shown in FIG. 5B.

The upper mount 220 is provided with an upper spring seat 222, while the housing of the cylinder 216 of the shock absorber 212 is provided with a lower spring seat 224. The coil spring 214 is disposed around the shock absorber 212 such that the upper and lower ends of the coil spring 214 are held in abutting contact with the respective upper and lower spring seats 222, 224.

In the strut type suspension system constructed as described above, the shock absorber 212 and the coil spring 214 cooperate to damp or absorb a vibrational load transmitted from the wheel 200 running on a roadway surface. On the other hand, the upper mount 220 including the elastic body 227 as its major component functions to damp or absorb a portion of the vibrational load that cannot be absorbed by the shock absorber 212 and coil spring 214, so that the transmission of the vibrational load to the vehicle body (panel 206) is inhibited by the upper mount 220.

The upper mount 220 includes a metal housing 226, and a main body 229 which is accommodated in the metal housing 226 and which has the elastic body 227 as its major component.

The housing 226 consists of an upper member 228 and a lower member 230 welded together, and includes a cylindrical wall portion 232, an upper wall portion 234, a bottom wall portion 236, and a fixing flange portion 240 which extends radially outwardly from an axially intermediate part of the cylindrical wall portion 232. The upper and lower members 228, 230 of the housing 226 are welded together at the fixing flange portion 240, and the upper mount 220 is fixed with screws 242 to the vehicle body panel 206 at the fixing flange portion 240 of the housing 226. The upper and lower wall portions 234, 236 have respective central openings 244, 246.

The elastic body 227 is a generally cylindrical or annular block formed of a rubber composition, and is provided with an inner rigid member in the form of an inner metal member 248 disposed in a radially central portion thereof. The piston rod 218 is fixed with a nut 250 at its upper end portion to the inner metal member 248 of the elastic body 227.

The elastic body 227 has an upper circumferential groove 252 and a lower circumferential groove 254 which are open in its respective upper and lower surfaces and which are formed with suitable depths, in the circumferential direction of the cylindrical wall portion 232. The elastic body 227 further has three stopper portions 256 formed on its upper surface, so as to protrude upwards, such that the three stopper portions 256 are spaced apart from each other in the circumferential direction of the housing 226. The stopper portions 256 are held in pressing contact with the lower surface of the upper wall portion 234 of the housing 226.

The three stopper portions 256 spaced apart from each other by a suitable spacing distance in the circumferential direction of the housing 226 cooperate with the upper surface of the elastic body 227 and the lower surface of the upper wall portion 234 of the housing 226, to define spacings S through which the upper central opening 244 of the upper wall portion 234 is held in communication with the upper circumferential groove 252.

In the upper mount 220 constructed as described above, a vertical oscillating movement of the piston rod 218 is absorbed by elastic deformation of the elastic body 227, so as to prevent the transmission of the vibrational load from the wheel 200 to the vehicle body. The upper and lower circumferential grooves 252, 254 are formed in the elastic body 227, for the purpose of giving the elastic body 227 a relatively soft spring characteristic in the vertical direction, to thereby improve the vibration damping or absorbing function of the elastic body 227. On the other hand, the stopper portions 256 are provided to prevent an excessive amount of elastic deformation of the elastic body 227 in the vertical direction upon application of a large vibrational load to the elastic body 227.

It is noted that the spring stiffness of the elastic body 227 tends to gradually decrease from the initial or nominal value with an increase in the cumulative operating time of the upper mount 220 with repeated elastic deformation of the elastic body 227 in the vertical direction. Accordingly, the amount of vertical elastic deformation of the elastic body 227 per unit amount of the input vibrational load gradually increases during the service life of the upper mount 220.

In the upper mount 220 of the type discussed above, the elastic body 227 is simply accommodated within the metal housing 226, without the elastic body 227 being bonded at its outer circumferential surface to the inner circumferential surface of the cylindrical wall portion 232 of the housing 226. In this arrangement, a considerably large amount of elastic deformation of the elastic body 227 in the vertical direction may undesirably cause a sliding displacement of the elastic body 227 at its outer circumferential surface relative to the inner circumferential surface of the cylindrical wall portion 232, resulting in undesirable generation of a noise due to the sliding displacement.

Further, the sliding displacement of the elastic body 227 leads to a problem of an increased amount of wear of the outer circumferential surface of the elastic body 227.

To solve the problems of the upper mount 220 of FIG. 5B, the upper mount 220 is modified as shown in FIG. 6, such that the elastic body 227 is formed by vulcanization within an outer metal sleeve 258 such that the formed elastic body 227 is bonded at its outer circumferential surface to the inner circumferential surface of the outer metal sleeve 258. The thus prepared main body 229 consisting of the elastic body 227 and the outer metal sleeve 258 is fixed within the metal housing 226 such that the outer metal sleeve 258 is press-fitted in the cylindrical wall portion 232, with the outer circumferential surface of the metal sleeve 258 held in pressing contact with the inner circumferential surface of the cylindrical wall portion 232.

In the upper mount 220 described above, the upper central opening 244 formed through the upper wall portion 234 may or may not be closed by a cap. In the absence of the cap, an aqueous component such as water which has entered through the upper central opening 244 flows into the upper circumferential groove 252 through the spacings S, resulting in a problem that the aqueous component is accumulated in the circumferential groove 252.

The aqueous component accumulated in the upper circumferential groove 252 may cause corrosion and rusting of the metallic material of the outer metal sleeve 258, and a risk of separation or removal of the elastic body 227 from the outer metal sleeve 258.

SUMMARY OF THE INVENTION

It is therefore an object of the present invention to provide an upper mount of a suspension system, which do not suffer from the problems described above.

The above object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) An upper mount in a suspension system of an automotive vehicle, said suspension system including a shock absorber having a piston rod, said upper mount comprising:

a rigid housing including a cylindrical wall portion, an upper wall portion having an upper central opening, and a fixing flange portion which extends radially outwardly from the cylindrical wall portion and at which the rigid housing is fixed to a body of the automotive vehicle; and a main body including (a) a generally cylindrical elastic body, (b) an inner rigid member disposed in a radially central portion of the elastic body and fixed to an upper end portion of the piston rod, and (c) an outer metal sleeve bonded to an outer circumferential surface of the elastic body, the main body being accommodated in the rigid housing such that the outer metal sleeve is fitted at an outer circumferential surface thereof in an inner circumferential surface of the cylindrical wall portion of the rigid housing;

the elastic body having a circumferential groove formed along an inner circumferential surface of the outer metal sleeve, and an upper surface which cooperates with the upper wall portion of the rigid housing to define a spacing, the upper central opening being held in communication with the circumferential groove through the spacing; and the elastic body further having an annular sealing lip integrally formed of a rubber material and located radially outwardly of the upper central opening of the upper wall portion such that the annular sealing lip is held in pressing contact with an inner surface of one of the upper wall portion and the cylindrical wall portion of the rigid housing, for preventing a flow of an aqueous component from the upper central opening to the outer metal sleeve.

In the upper mount constructed according to the above mode (1) of the present invention, the annular sealing lip formed integrally with the elastic body prevents a flow of the aqueous component such as water from the central opening formed through the upper wall portion of the rigid housing, to the outer metal sleeve, even in the presence of a spacing between the upper surface of the elastic body and the inner surface of the upper wall portion of the housing. Accordingly, the annular sealing lip makes it possible to solve the problem of corrosion or rusting of the outer metal sleeve due to exposure to the aqueous component which has entered into the housing. Further, the annular sealing lip preventing the flow of the aqueous component to the outer metal sleeve makes it possible to eliminate a risk of separation or removal of the outer metal sleeve and the elastic body from each other due to exposure to the aqueous component.

The annular sealing lip may be spaced apart from the outer metal sleeve in a radially inward direction of the outer metal sleeve. In this case, however, the annular sealing lip has a risk of sliding displacement relative to the rigid housing due to deformation of the elastic body.

(2) An upper mount according to the above mode (1), wherein the outer metal sleeve has an annular inward projection formed at an upper end thereof over an entire circumference thereof, so as to extend in a radially inward direction of the outer metal sleeve, and the annular sealing lip is formed such that the annular inward projection is embedded in the annular sealing lip.

In the upper mount according to the above mode (2), the annular inward projection of the outer metal sleeve functions as a core of the annular sealing lip, so as to prevent or minimize sliding displacement of the sealing lip relative to the rigid housing, thereby preventing undesirable generation of a noise due to the sliding displacement.

(3) An upper mount according to the above mode (1) or (2), wherein the elastic body further has an integrally formed annular rubber layer covering an inner circumferential surface of an axial portion of the outer metal sleeve which corresponds to an axial dimension of the upper circumferential groove as measured in the axial direction of the elastic body.

In the upper mount according to the above mode (3), the annular rubber layer covering the upper portion of the outer metal sleeve cooperates with the annular sealing lip to more effectively prevent the removal or separation of the outer metal sleeve and the elastic body from each other.

(4) An upper mount according to any one of the above modes (1)–(3), wherein the upper wall portion of the rigid housing includes a radially outer slant section inclined with respect to a radially inner section thereof, and the annular sealing lip is held in pressing contact at an upper end thereof with an inner surface of the radially outer slant section.

(5) An upper mount according to any one of the above modes (1)–(4), wherein the elastic body further has a plurality of stopper portions formed on the upper surface thereof such that the stopper portions are spaced apart from each other in the circumferential direction of the elastic body, the stopper portions cooperating with the upper surface of the elastic body and an inner surface of the upper wall portion of the rigid housing to define a plurality of spacings for communication between the upper central opening and the circumferential groove.

(6) An upper mount according to the above mode (5), wherein the elastic body further has a plurality of radial grooves formed in the upper surface thereof, so as to extend in a radial direction of the elastic body, between adjacent ones of the plurality of stopper portions.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
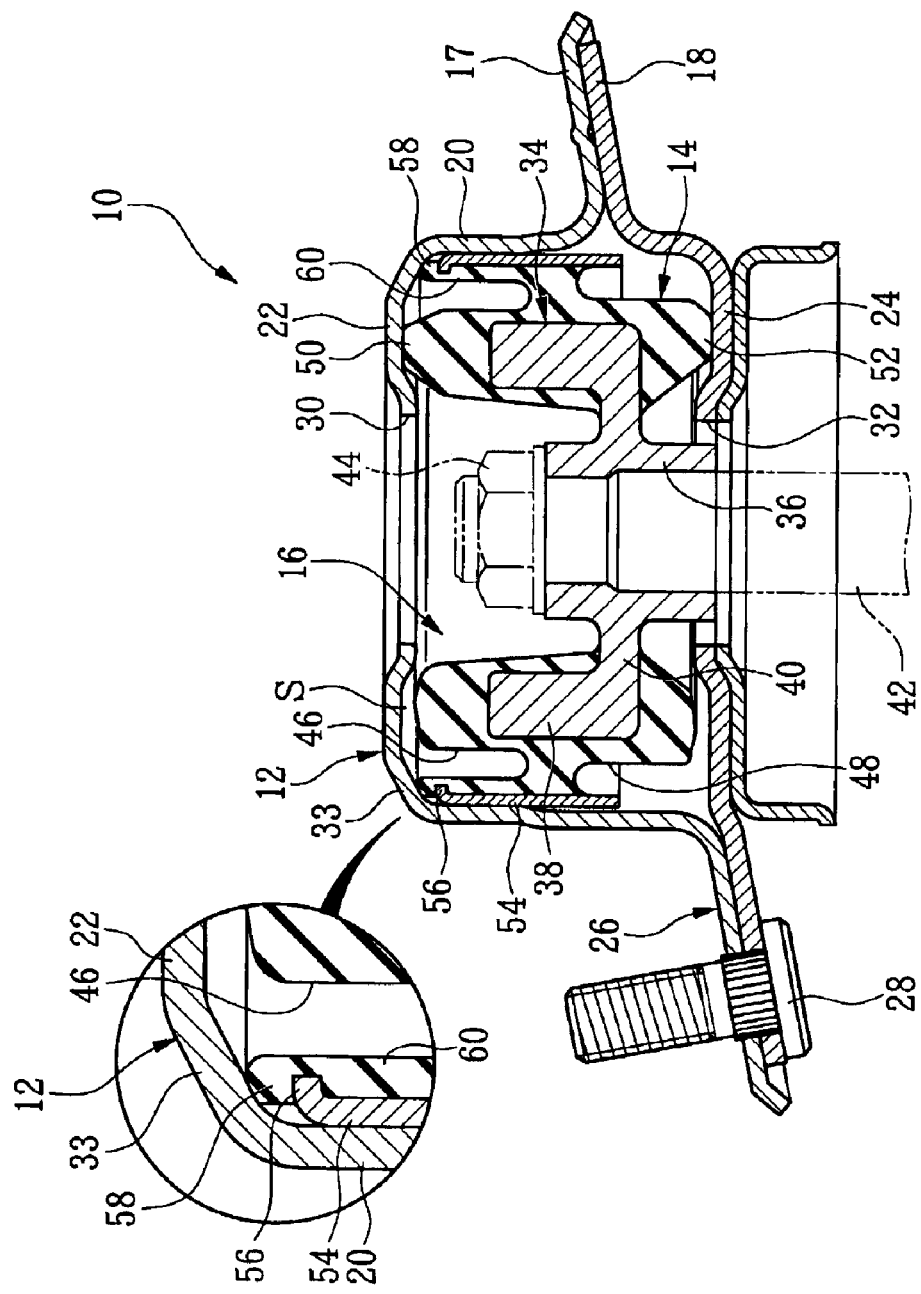
FIG. 1 is an elevational view in cross section of an upper mount constructed according to one embodiment of this invention.
Figure 2:
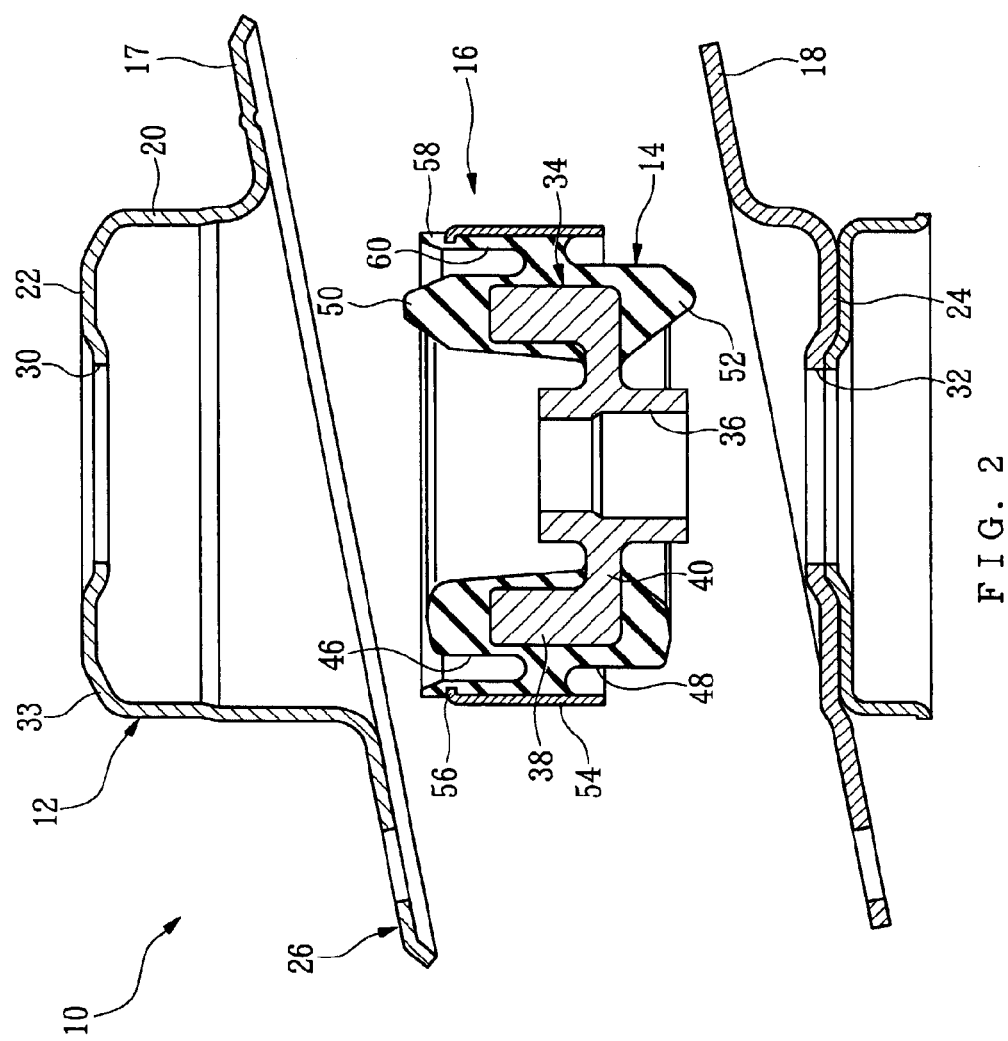
FIG. 2 is an exploded elevational view showing components of the upper mount of FIG. 1, prior to assembling into the upper mount.

Referring first to FIGS. 1 and 2, there is shown an upper mount 10 constructed according to a first embodiment of this invention, for use in a strut type suspension system of an automotive vehicle. The upper mount 10 includes a rigid housing in the form of a metal housing 12, and a main body 16 which is accommodated within the metal housing 12 and which includes an elastic body 14 as a major component thereof.

The metal housing 12 consists of an upper member 17 and a lower member 18 which are welded together, and includes a cylindrical wall portion 20, an upper wall portion 22, a bottom wall portion 24, and a fixing flange portion 26 which extends radially outwardly from an axially intermediate part of the cylindrical wall portion 20. The upper and lower members 17, 18 of the housing 12 are welded together at the fixing flange portion 26, and the upper mount 10 is fixed with screws 28 to a panel of the body of the vehicle at the fixing flange portion 26 of the housing 12. The upper and lower wall portions 22, 24 have respective central openings 30, 32. The upper wall portion 22 has a radially outer section in the form of a slant section 33 inclined with respect to a radially inner section thereof.

The elastic body 14 is a generally cylindrical or annular block formed of a rubber composition, and is provided with an inner rigid member in the form of an inner metal member 34 disposed in a radially central portion thereof. The inner metal member 34 includes an inner cylindrical portion 36, an outer large-diameter portion 38 formed radially outwardly of the inner cylindrical portion 36, and a connecting portion 40 connecting the inner cylindrical portion 36 and the outer large-diameter portion 38. The outer large-diameter portion 38 is embedded in the elastic body 14.

The strut type suspension system of the vehicle includes a shock absorber provided with a piston rod 42 as indicated by two-dot chain line in FIG. 1. The piston rod 42 is fixed at its upper end portion with a nut 44 to the inner cylindrical portion 36 of the inner metal member 34. The inner metal member 34 is bonded to the elastic body 14 when the elastic body 14 is formed by vulcanization of an unvulcanized rubber composition.

The elastic body 14 has an upper circumferential groove 46 and a lower circumferential groove 48 which are open in its respective upper and lower surfaces and which are formed with suitable depths, in the circumferential direction of the cylindrical wall portion 20 of the metal housing 12. The elastic body 14 further has a plurality of upper stopper portions 50 formed on its upper surface, and a plurality of lower stopper portion 52 formed on its lower surface. The upper stopper portions 50 protrude upwards such that the upper stopper portions 50 are spaced apart from each other in the circumferential direction of the housing 12, and the lower stopper portions 52 protrude downwards such that the lower stopper portions 52 are spaced apart from each other in the circumferential direction of the housing 12. The upper stopper portions 50 and the lower stopper portions 52 are held in pressing contact with the respective inner surfaces of the upper and lower wall portions 22, 24 of the housing 12.

The upper stopper portions 50 spaced apart from each other by a suitable spacing distance in the circumferential direction of the housing 12 cooperate with the upper surface of the elastic body 14 and the inner surface of the upper wall portion 22 of the housing 12, to define spacings S through which the upper central opening 30 of the upper wall portion 22 is held in communication with the upper circumferential groove 46.

Figure 3:
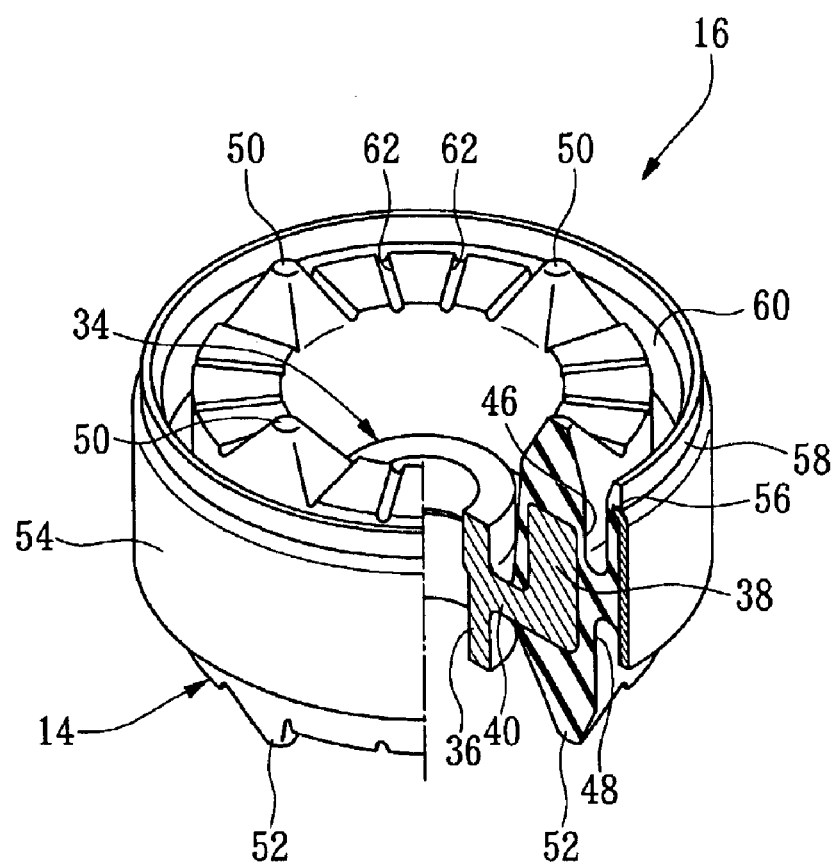
FIG. 3 is a perspective view of a main mounting body of the upper mount of FIG. 1.

The elastic body 14 further has a plurality of radial grooves 62 formed in its upper surface, so as to extend in the radial direction of the inner metal member 34, between the adjacent upper stopper portions 50, as shown in FIG. 3. The upper central opening 30 of the upper wall portion 22 is held in communication with the upper circumferential groove 46 through the radial grooves 62 as well as the above-indicated spacings S.

An outer metal sleeve 54 is fitted on the outer circumferential surface of the elastic body 14. The outer metal sleeve 54 is bonded at its inner circumferential surface to the outer circumferential surface of the elastic body 14 when the elastic body 14 is formed by vulcanization. The main body 16 of the upper mount 10 consisting of the outer metal sleeve 54 and the elastic body 14 is fixed in the metal housing 12 such that the outer metal sleeve 54 is press-fitted in the cylindrical wall portion 20 of the housing 12.

The outer metal sleeve 54 has an annular inward projection 56 formed at its upper end over its entire circumference. The annular inward projection 56 extends by a short distance in the radially inward direction of the outer metal sleeve 54 from its main cylindrical portion.

As shown in enlargement in FIG. 1, the main body 16 includes an annular sealing lip 58 formed of a rubber material integrally with the elastic body 14, along the annular open end of the outer metal sleeve 54. This annular sealing lip 58 is held in pressing contact with the inner surface of the upper wall portion 22, more precisely, with the inner surface of the radially outer slant section 33 of the upper wall portion 22. The annular sealing lip 58 functions to prevent an aqueous component such as water which has entered into the housing 12 through the upper central opening 30, from flowing in the radially outward direction toward the outer metal sleeve 54.

The inward projection 56 at the upper end of the outer metal sleeve 54 is embedded within the annular sealing lip 58, so that the inward projection 56 functions as a core of the annular sealing lip 58, and thereby effectively prevents or minimizes displacement of the sealing slip 58 relative to the inner surface of the housing 12, more specifically, relative to the inner surface of the slant section 33 of the upper wall portion 22, when the elastic body 14 is elastically deformed during use of the upper mount 10.

In the main body 16 of the present upper mount 10, the inner circumferential surface of an axial portion of the outer metal sleeve 54 which corresponds to the upper circumferential groove 46 is entirely covered by an annular rubber layer 60. This rubber layer 60 and the sealing lip 58 are formed integrally with the elastic body 14.

It is noted that the sealing lip 58 also functions as a rubber layer covering the upper end face and the inner circumferential surface of the upper end portion of the outer metal sleeve 54.

In the upper mount 10 constructed as described above according to the present embodiment of this invention, the aqueous component which has entered into the housing 12 through its upper opening 30 is prevented by the sealing action of the sealing lip 58, from reaching or flowing to the outer metal sleeve 54, so that the outer metal sleeve 54 is effectively protected against corrosion or rusting due to exposure to the aqueous component. Thus, the sealing lip 58 makes it possible to solve the problems encountered in the prior art.

In addition, the rubber layer 60 covering the entirety of the inner circumferential surface of the upper portion of the outer metal sleeve 54 cooperates with the annular sealing lip 58 protecting the outer metal sleeve 54 against exposure to the aqueous component, to effectively prevent separation or removal of the elastic body 14 and the outer metal sleeve 54 from each other at their mutually bonded surfaces, which would take place due to the exposure to the aqueous component.

Further, the inward projection 56 formed at the upper end of the outer metal sleeve 54 so as to be embedded in the sealing lip 58 and functioning as the core of the sealing lip 58 is effective to prevent or minimize the displacement of the sealing lip 58 relative to the upper wall portion 22 of the metal housing 12, upon elastic deformation of the elastic body 14, thereby effectively preventing generation of a noise due to the relative displacement of the sealing lip 58.

Figure 4:
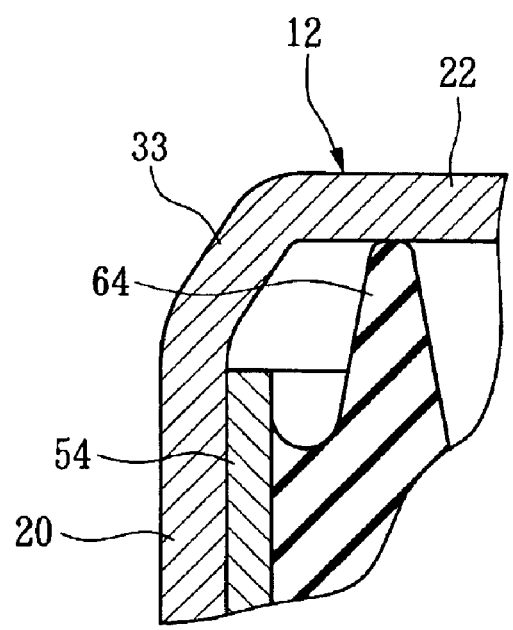
FIG. 4 is a fragmentary elevational view in cross section showing a part of an upper mount according to another embodiment of the present invention.
Figure 5A:
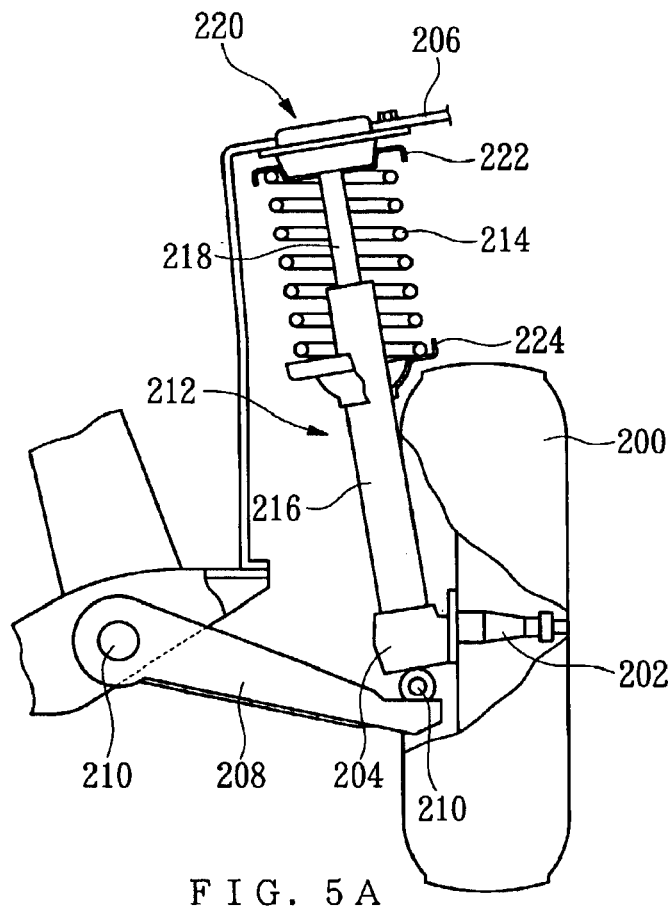
FIG. 5A is an elevational view of a strut suspension system including a known upper mount.
Figure 5B:
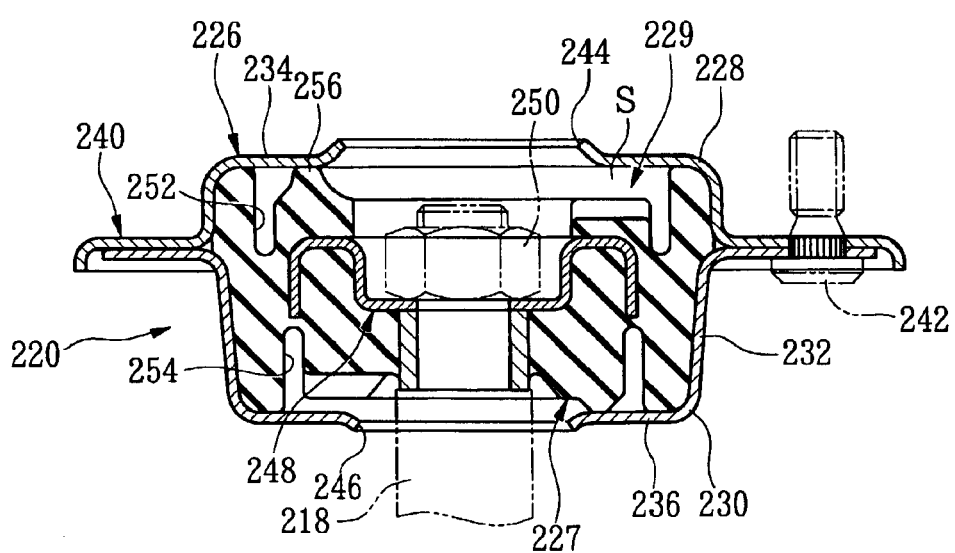
FIG. 5B is an elevational view in cross section of the upper mount of FIG. 5A.
Figure 6:
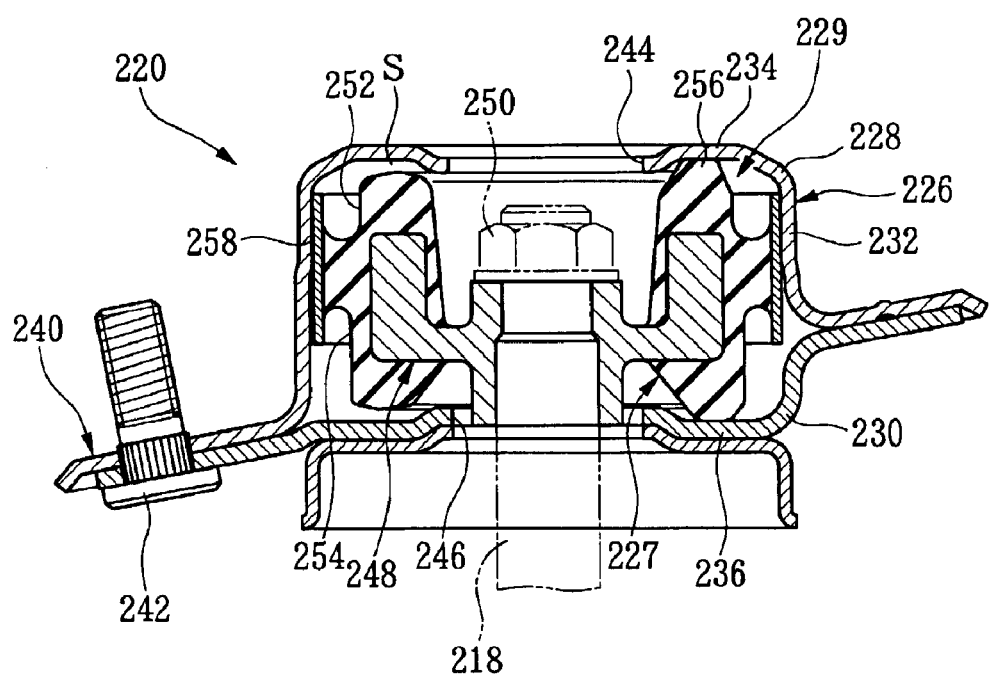
FIG. 6 is an elevational view in cross section of an upper mount which is constructed to solve the problems of the upper mount of FIG. 5B and which includes an outer metal sleeve.

Referring next to FIG. 4, there will be described an upper mount according to a second embodiment of this invention, wherein the annular sealing lip 64 is spaced apart from the outer metal sleeve 54 in the radially inward direction, and is formed so as to extend upwards from the main body of the elastic body 14 such that the sealing lip 64 is held in pressing contact at its upper end with the inner surface of the upper wall portion 22. The outer metal sleeve 54 does not have the inward projection 56 provided in the first embodiment of FIGS. 1–3.

In the second embodiment, too, the annular sealing lip 64 prevents corrosion or rusting of the outer metal sleeve 54, and a flow of the aqueous component toward the outer metal sleeve 54, thereby effectively preventing separation or removal of the outer metal sleeve 54 and the elastic body 14 from each other.

While the preferred embodiments of the present invention have been described above in detail for illustrative purpose only, it is to be understood that the present invention may be embodied with various changes, modifications and improvements, which may occur to those skilled in the art, without departing from the spirit and scope of the invention defined in the following claims.

For example, the elastic body 14 may be provided with a sealing lip which is formed for abutting or pressing contact with the inner circumferential surface of an upper portion of the cylindrical wall portion 20 of the metal housing 12, which upper portion is spaced apart from the upper end of the outer metal sleeve 54 in the upward direction.

What is claimed is:

1. An upper mount for a suspension system of a vehicle, which suspension system includes a shock absorber having a piston rod, said upper mount comprising:

a rigid housing including a cylindrical wall portion, an upper wall portion having an upper central opening, and a mounting flange portion which extends radially outwardly from said cylindrical wall portion for fixing said rigid housing to a body of a vehicle; and a main body comprising (a) a generally cylindrical elastic body, (b) an inner rigid member located in a radially central portion of said elastic body and fixed to an upper end portion of said piston rod, and (c) an outer metal sleeve bonded to an outer circumferential surface of said elastic body, said main body being located in said rigid housing such that said outer metal sleeve is located at an outer circumferential surface thereof in an inner circumferential surface of said cylindrical wall portion of said rigid housing;

said elastic body having a circumferential groove along an inner circumferential surface of said outer metal sleeve, and an upper surface which cooperates with said upper wall portion of said rigid housing to define a spacing, said upper central opening being held in communication with said circumferential groove through said spacing; and said elastic body further comprising an annular sealing lip comprising a rubber material integral with said elastic body, located along an annular open end of said outer metal sleeve and located radially outwardly of said upper central opening of said upper wall portion such that said annular sealing lip includes a portion located between and in contact with an inner surface of said upper wall portion of said rigid housing and a surface of said annular open end of said outer metal sleeve, for preventing a flow of an aqueous material from said upper central opening to said outer metal sleeve, said surface of said annular open end of said outer metal sleeve being spaced apart from said inner surface of said upper wall portion of said rigid housing.

2. The upper mount according to claim 1, wherein said outer metal sleeve comprises an annular inward projection located at an upper end thereof over an entire circumference thereof, extending in a radially inward direction from said outer metal sleeve, and said annular inward projection is embedded in said annular sealing lip.

3. The upper mount according to claim 1, wherein said elastic body further comprises an annular rubber layer covering an inner circumferential surface of an axial portion of said outer metal sleeve which corresponds to an axial dimension of said upper circumferential groove as measured in an axial direction of said elastic body.

4. The upper mount according to claim 1, wherein said upper wall portion of said rigid housing comprises a radially outer slant section inclined with respect to a radially inner section thereof, and said annular sealing lip is held in pressing contact at an upper end thereof with an inner surface of said radially outer slant section.

5. The upper mount according to claim 1, wherein said elastic body further comprises a plurality of stopper portions located on said upper surface thereof such that said stopper portions are spaced apart from each other in said circumferential direction, said stopper portions cooperating with said upper surface of said elastic body and an inner surface of said upper wall portion of said rigid housing to define a plurality of spacings for communication between said upper central opening and said circumferential groove.

6. The upper mount according to claim 5, wherein said elastic body further comprises a plurality of radial grooves located in said upper surface thereof, extending in a radial direction of said elastic body, between adjacent ones of said plurality of stopper portions.

* * * * *